T. A. WILLARD.
STORAGE BATTERY.
APPLICATION FILED AUG. 7, 1916.

1,377,995.

Patented May 10, 1921.

Inventor
Theodore A. Willard
by Thurston & Kwis
Attys

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,377,995.     Specification of Letters Patent.     Patented May 10, 1921.

Application filed August 7, 1916. Serial No. 113,423.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

The present invention relates to storage batteries, and particularly to certain improvements in means for cross connecting adjacent cells. The object of the invention is to provide a cross connecting conductor, so formed and so connected to the terminal posts of the cells that the cross connecting and disconnecting can be accomplished easily, and at the same time the conductivity of the cell, or pair of cells, is enhanced.

In accordance with my invention, the cross connector is in the form of a U-shaped strap, the ends of which are adapted to be inserted in the posts of the cells in such a way that there is a good conducting area between the parts, and little liability of the connector being loosened. Preferably, the ends of the connector which extend into the posts are fluted or otherwise formed so that the connector will be securely held in the posts, and are inserted well down into the cells to, or substantially to, the cross connecting strap of the battery plates, thus increasing very materially the conductivity over or above that which would be provided simply by the posts themselves.

My invention may be further briefly summarized as consisting in certain novel details of construction and combinations and arrangements of parts which will be described in the specification and set forth in the appended claims.

Figure 1:
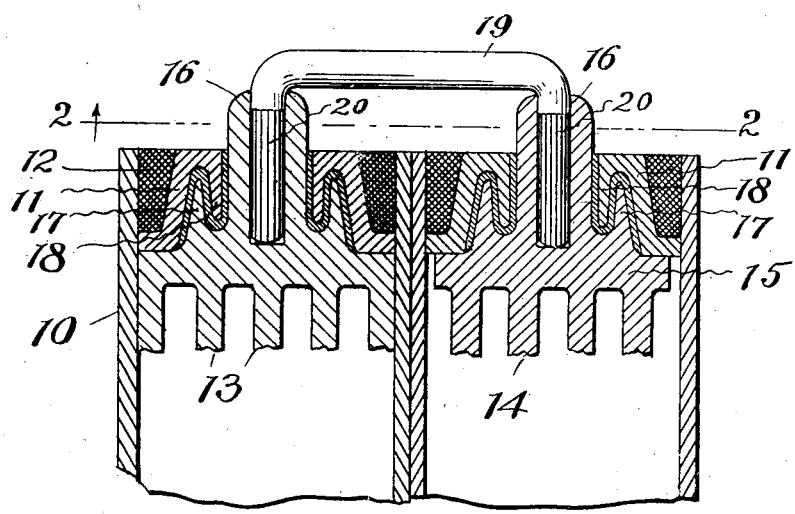
Figure 2:
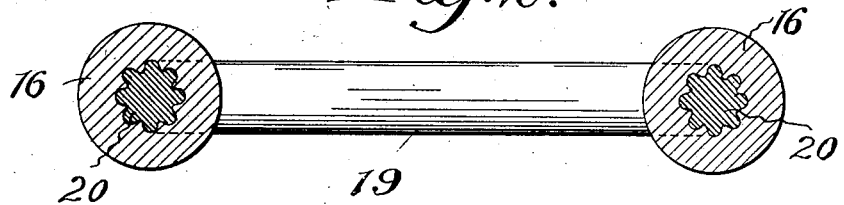

In the accompanying sheet of drawings are shown portions of two cells of a battery, which may, of course, have any number of cells, Figure 1 being a vertical sectional view through the terminal posts with the connector in elevation; and Fig. 2 is a cross sectional view substantially along the line 2—2 of Fig. 1 looking upwardly.

In the drawings, each of the two cells includes a jar 10 adapted to receive the battery solution and the positive and negative plates, and provided with a cover 11, sealed around its perimeter to the jar, as shown at 12. Each jar contains, as is customary, the positive and negative plates, the plates of one polarity being designed to be connected to the plates of opposite polarity, as is well understood. In the drawings I have shown in one cell simply the plates 13 of one polarity, and in the other cell the plates 14 of opposite polarity. The plates of each group are connected by a strap 15, from which projects upwardly through an opening provided in the corresponding cover 11, a lead terminal post 16, which in this instance is somewhat larger in diameter than customary. It will be observed also that each post is provided near its base with an integral upturned flange 17, which surrounds the post, and that the cover is provided also around the post with a depending flange 18 which extends down into, and is sealed in the well or receptacle which is formed by the flange 17.

For the purpose of cross connecting the plates 13 and 14, I employ a U-shaped conductor 19, provided with rather long parallel ends 20, which are embedded in the posts 16, and extend substantially throughout the length of the latter, to, or substantially to, the straps 15. Inasmuch as this conductor is formed of copper or other good conducting material, the conductivity of the cells is by this construction, considerably greater than it would be if the conductivity of the lead alone were relied on to convey the current to or from the plates, or from cell to cell. In order that copper may be employed without danger of erosion, the conductor 19, or the portion thereof which protrudes from, or is above the post 16, is preferably coated with lead.

In order that the cross connector may be securely embedded in the posts without danger of turning or becoming loose, the ends of the connector are provided with a large surface made by giving the ends of the conductor an irregular shape, preferably by fluting as here shown.

With this construction the jars can be both connected and disconnected very easily, and this being accomplished in the following manner: To cross connect any two adjacent cells the cross conductor is heated, such as by passing an electric current through the same, although other means of heating may be employed, and then the ends of the conductor are pressed down into the posts which are previously provided with openings somewhat smaller than the ends of the connector. The heat of the connector is sufficient to melt the lead around the openings provided in the posts, so that the ends of the connector can be inserted the full distance in the posts, and will become thoroughly embedded therein, the melted lead completely filling the grooves of the connector. In fact, the opening in the post will conform exactly with the shape of the connector end. To remove the connector, all that it is necessary to do is to apply heat to the connector by a blow torch or other suitable means, and when the heat is sufficient to melt or soften the lead around the post, the connector can be withdrawn without in any way distorting the post. Afterward it can be replaced in the manner previously explained.

I do not desire to be confined to the exact details shown, but aim in my claims to cover all modifications which do not involve a departure from the spirit and scope of my invention.

Having thus described my invention, what I claim is:

1. In a storage battery, a pair of cells each comprising a chamber containing a group of battery plates connected together by an integral and substantially horizontal strap with an integral post extending upwardly from an intermediate point of the strap, and a one-piece substantially U-shaped cross connector extending across from one cell to the other and having its end portions extending centrally and axially into and embedded in the posts of the two cells.

2. In a storage battery, a pair of cells each comprising a chamber containing a plurality of plates connected together by an integral strap having an integral post extending upwardly therefrom, and a cross connector which is substantially U-shaped, connecting the two cells and having its end portions embedded in the posts and extending centrally and axially through the latter substantially to the straps from which the posts extend.

3. In a storage battery, a pair of cells each comprising a chamber containing a plurality of plates connected together by an integral substantially horizontal strap and the latter having an integral post extending upwardly therefrom, and a cross connector substantially U-shaped, and having end portions of irregular shape embedded in the posts of the two cells and extending downwardly centrally and axially substantially to the straps.

In testimony whereof, I hereunto affix my signature.

THEODORE A. WILLARD.